(12) United States Patent
O'Connor

(10) Patent No.: US 6,961,592 B2
(45) Date of Patent: Nov. 1, 2005

(54) BATTERY PROTECTION CIRCUIT

(76) Inventor: Gavin Paul O'Connor, 24 Kamealboom Street, Eispark, Germiston, Gauteng (ZA) 1401

( * ) Notice: Subject to any disclaimer, the term of this patent is extended or adjusted under 35 U.S.C. 154(b) by 257 days.

(21) Appl. No.: 10/467,984

(22) PCT Filed: Dec. 13, 2001

(86) PCT No.: PCT/ZA01/00205

§ 371 (c)(1),
(2), (4) Date: Aug. 13, 2003

(87) PCT Pub. No.: WO02/065613

PCT Pub. Date: Aug. 22, 2002

(65) Prior Publication Data

US 2004/0062387 A1 Apr. 1, 2004

(30) Foreign Application Priority Data

Feb. 13, 2001 (ZA) ................................. 2001/1217

(51) Int. Cl.[7] .......................... H04B 17/00; H04M 1/00
(52) U.S. Cl. ................... 455/572; 455/67.11; 379/412; 379/413; 320/134; 320/136
(58) Field of Search ............................... 455/572, 573, 455/574, 67, 11; 379/412, 413, 413.02, 413.03, 379/413.05; 320/134, 136, 137

(56) References Cited

U.S. PATENT DOCUMENTS

| | | | |
|---|---|---|---|
| 5,350,993 A | 9/1994 | Toya et al. | |
| 5,371,453 A | 12/1994 | Fernandez | |
| 5,483,276 A * | 1/1996 | Brooks et al. | ................. 725/10 |
| 5,717,307 A | 2/1998 | Barkat et al. | |
| 6,069,468 A | 5/2000 | Sonobe | |
| 6,405,062 B1 * | 6/2002 | Izaki | ........................... 455/573 |
| 6,577,883 B1 * | 6/2003 | Ueda | ........................... 455/573 |
| 6,625,477 B1 * | 9/2003 | Wakefield | .................... 455/572 |
| 6,697,645 B1 * | 2/2004 | MacFarlane | ................. 455/566 |
| 6,798,171 B2 * | 9/2004 | Sakurai | ....................... 320/132 |
| 6,873,135 B2 * | 3/2005 | Nakatsuji | ..................... 320/132 |
| 2001/0021663 A1 * | 9/2001 | Sawada et al. | ............. 455/572 |
| 2003/0181226 A1 * | 9/2003 | Kawata et al. | .............. 455/572 |
| 2005/0085277 A1 * | 4/2005 | Chen et al. | ................. 455/572 |
| 2005/0124389 A1 * | 6/2005 | Yang | ........................... 455/574 |

FOREIGN PATENT DOCUMENTS

| | | |
|---|---|---|
| DE | 3528659 | 2/1987 |
| JP | 5198293 | 9/1994 |
| JP | 8106894 | 4/1996 |
| JP | 200030757 | 5/2000 |

* cited by examiner

OTHER PUBLICATIONS

Double Protection Circuit for Li-Ion Battery Pack; IBM Technical Disclosure Bulletin; Jan. 1998; p. 93; vol. 41, No. 01; IBM Corp. US.

Primary Examiner—CongVan Tran
(74) Attorney, Agent, or Firm—Keusey, Tutunjian & Bitetto, P.C.

(57) ABSTRACT

A protection circuit for a cellular telephone battery includes a first memory for storing battery identification data and a second memory associated with the telephone includes data relating to which battery type may be used by this telephone. When the battery is connected to the telephone, the battery identification data is compared to the battery type data stored in the telephone. The battery is automatically disconnected from the telephone if the two sets of data do not correspond to each other.

6 Claims, 3 Drawing Sheets

BATTERY PROTECTION CIRCUIT

BACKGROUND OF THE INVENTION

This invention relates generally to a cellular telephone and more particularly is concerned with providing protection relating to the use of a battery with a cellular telephone.

In general, cellular telephones are not permitted to be used in hazardous locations such as petrochemical refineries, mines, or any environment in which gas, vapours, solvents, flying fibres and dust are present for there is a risk that the telephone, or its battery, could create an arc or a spark which could cause an explosion.

A spark could arise in a number of ways. For example an incorrect battery could be connected to a cellular telephone and, in use, the battery could become excessively hot, provide an over-voltage or over-current, or some other factor could arise which generates a spark. The problem is compounded in that printed circuit boards which are used with cellular telephones are, in their nature, of compact construction with very small track width and minimal track separation.

Any possible short circuit condition is of particular importance. A typical lithium ion battery can produce as much 30 Amps on a short circuit condition and this can destroy the entire battery. Although it is known to make use of a protection integrated circuit in a battery pack this type of circuit limits the amount of charge and discharge current but does not provide sufficient protection against abnormal conditions which can destroy the protection integrated circuit.

Another potential problem can arise when the battery is recharged. If the temperature of the charger increases, for whatever reason, above a predetermined level unwanted effects can occur which can give rise to the generation of a spark.

In the light of problems of the aforegoing type, and as a general rule, the use of a cellular telephone in a hazardous location is not permitted.

SUMMARY OF THE INVENTION

The invention provides, in the first instance, a method of providing protection relating to the use of a cellular telephone which includes the steps of:
(a) storing first data, which identifies a battery which is permitted to be used with the telephone, in a first memory in a protection circuit which is associated with the battery;
(b) storing second data, which identifies the said permitted battery, in a second memory which is associated with the telephone; and
(c) allowing the said battery to power the telephone only if the said first data corresponds to the said second data.

The method may include the step of disconnecting the battery from the protection circuit upon the occurrence of at least one of the following:
(a) if the temperature of the telephone exceeds a predetermined temperature; and
(b) if the current drawn from the battery exceeds a predetermined current.

When the battery is recharged by a charger the temperature of the charger may be monitored and, if the temperature of the charger exceeds a predetermined temperature, the battery may be disconnected from the charger or the battery may be disconnected from the telephone. Both steps can be carried out.

The invention also extends to a protection circuit for a battery which is used with a cellular telephone, the protection circuit including:
(a) a first memory in which is stored first data which identifies the battery;
(b) a comparator for comparing the first data to second data which is stored in a second memory associated with the telephone and which identifies a battery which is permitted to be used with the telephone; and
(c) a switch which is responsive to the comparator and which allows the said battery to power the telephone only if the first data corresponds to the second data.

The protection circuit may include means for disconnecting the battery from the telephone if the temperature of the telephone exceeds a predetermined temperature. The said means may be a thermal fuse. Preferably the thermal fuse is also a current fuse.

A sensor may be provided for monitoring the temperature of a charger which is used for recharging the battery and the protection circuit may include switch means which is responsive to the sensor and which is operable, when the temperature of the charger exceeds a predetermined temperature, to carry out at least one of the following:
(a) to disconnect the battery from the charger; and
(b) to disconnect the battery from the telephone.

The protection circuit may be encapsulated in a solid insulating material of any appropriate type e.g. a polyurethane resin.

Care is taken in selecting the battery. Preferably the battery is a manganese dioxide cell of the type sold by NEC which has the capability of being able to withstand a short circuit condition without exploding. This is to be contrasted with cobalt dioxide cells which are effectively destroyed, giving rise to unwanted sparks, if short circuited without a protection circuit.

The battery, when used, generates hydrogen gas which must be vented to atmosphere. In accordance with a preferred feature of the invention a vent cap for the battery, which is encapsulated in an insulating material, is placed at a lower region of the battery, as opposed to a position on a side or at an upper region of the battery, so that the battery is prevented from swelling and discharging.

The protection circuit of the invention is preferably provided in combination with the battery, as an integral unit. The battery and the protection circuit, in combination, are preferably encapsulated in a suitable insulating material e.g. a polyurethane resin.

BRIEF DESCRIPTION OF THE DRAWINGS

The invention is further described by way of example with reference to the accompanying drawings in which.

DESCRIPTION OF PREFERRED EMBODIMENT

Figure 1:
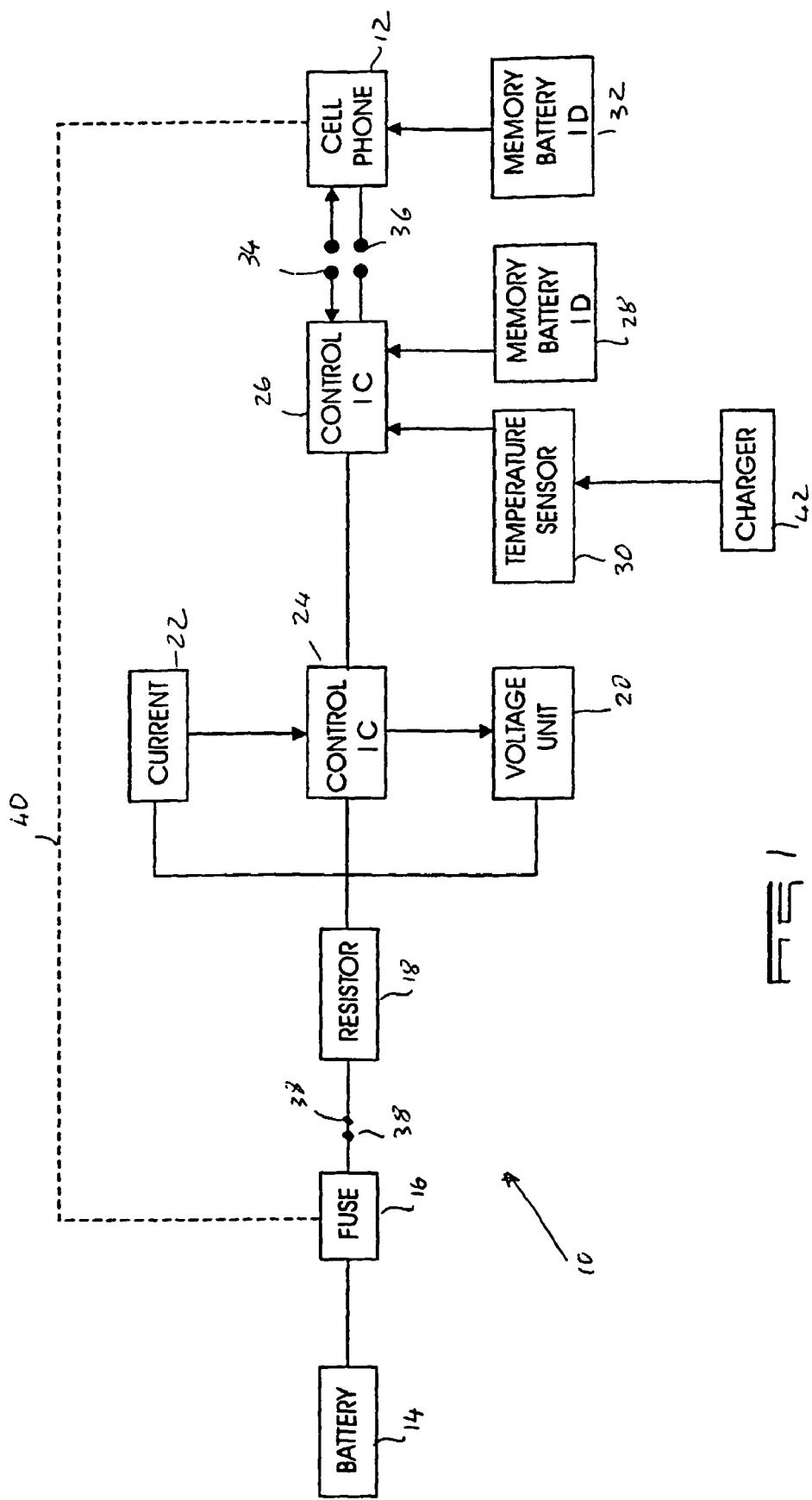
FIG. 1 is a block diagram representation of a protection circuit according to the invention which is connected to a cellular telephone.

FIG. 1 of the accompanying drawings illustrates in block diagram form a protection circuit 10, according to the invention, which is connected to a cellular telephone 12.

The protection circuit is provided in combination with a battery 14, i.e. as an integral unit. The battery is used for powering the cellular telephone.

The battery supplies power to the components of the circuit 10 through a thermal and current fuse 16 and current limiting resistor 18.

The circuit includes an over-voltage detecting unit 20, a unit 22 for detecting excess current supplied by the battery, a first control integrated circuit 24, a second control integrated circuit 26 which includes onboard memory 28, and a temperature sensor 30.

The cellular phone includes an on board memory 32 which is also referred to as a flash integrated circuit. The memory 32 is conventional and is supplied as original equipment in the cellular telephone. The capacity of the memory 32 is generally substantially in excess of what is required for operating the cellular telephone. The interaction of the cellular telephone with the flash integrated circuit is known in the art and is not further described herein. It is however possible, for a person skilled in the art, to access the memory 32 and store code, i.e. computer software, in the memory.

The battery 14 is carefully selected according to predetermined criteria to provide a maximum extent of inherent safety protection, in use with the cellular telephone. Preferably use is made of a manganese dioxide battery of a type which is sold by NEC and which has the capability of withstanding a short circuit condition, in the absence of a protection circuit, without exploding. Details of the battery type are recorded as identity data which is unique to the battery. The identity data is then entered into the memory 32 where the data is permanently stored.

It is to be understood that the identity data can take on any suitable format and may comprise a string of characters of suitable length to ensure that the data is, a matter of fact and for all practical purposes, unique and pertains only to the chosen battery type.

The same identity data is entered into, and is permanently stored in, the memory 28.

It is to be understood that the second control integrated circuit 26 has onboard intelligence and is capable of executing software instructions.

The protection circuit 10 includes output terminals 34 which can make electrical contact with corresponding contacts 36 on the cellular telephone 12. This aspect is of course known in the art.

The battery 14 and the fuse 16 are connected to the remainder of the protection circuit 10 through terminals 38.

The fuse 16 is physically positioned so that it is in close proximity to the cellular telephone 12. This characteristic is designated by means of a dotted line 40.

The temperature sensor 30 has the capability of sensing the temperature of a charger 42 which may be used, from time to time, to recharge the battery 14. This aspect is known in the art and is not further described herein. It is pointed out however that the charger 42 does not form part of the protection circuit 10.

The components to the left of the terminals 34, i.e. the battery 14 and the protection circuit 10, but excluding the charger 42, are encapsulated in an insulating material such as a polyurethane resin. The terminals 34 are exposed so that they can make electrical contact with the contacts 36.

When the encapsulated components are connected to the cellular telephone 12 the second control integrated circuit 26 interrogates the memory 32 and reads the stored data therein which relates to the identity of the battery 14, which is permitted to be used with the cellular telephone 12. The data which is read from the memory 32 is compared by the circuit 26 to the data which is held in the onboard memory 28 and which uniquely identifies the battery 14. If the data in the memory 32 corresponds with the data in the memory 28 then this is taken as positively indicating that the battery 14 can, as a matter of fact, be used with the cellular telephone 12 and the electrical connection between the protection circuit 10 and the cellular telephone 12 is maintained. It is therefore possible to operate the cellular telephone with power being provided by the battery 14. If however the comparison process shows that the data in the memory 32 does not correspond with the data in the memory 28 then it is taken that the battery 14 may not be used with the cellular telephone 12 and the circuit 26 automatically and immediately interrupts the supply of power from the battery to the cellular telephone.

The current which is supplied by the battery 14 to the remainder of the circuitry passes through the fuse 16. The fuse also senses the temperature of the cellular telephone 12. If the supplied current, or the temperature of the cellular telephone 12, is too high then the fuse fuses and opens circuits the path between the battery and the remainder of the circuit.

The resistor 18 is a current limiting resistor which has considerable power handling capacity. Thus the resistor 18 is used to limit current which is supplied by the battery to the circuit 10, in order to prevent any component in the circuit 10 from fusing. On the other hand the rating of the resistor 18 is such that, even if an over-current situation does occur, the resistor will not fuse. Fusing of electrical components is to be avoided as far as is possible, for fusing inevitably results in localised high temperatures which can be dangerous in a hazardous atmosphere.

The first control integrated circuit 24 is responsive to the voltage unit 20 and the current unit 22. The former unit monitors the voltage supplied by the battery 14 and limits this voltage in the event the voltage exceeds a safe value. The current unit 22 monitors current charge and current discharge rates when the battery 14 is recharged by the charger 42 or is drained, during usage. In each case if the current flow rate is too high the unit acts to limit or interrupt the current flow.

The temperature sensor 30, as has been indicated, monitors the temperature of a charger 42 when this is used to recharge the battery 14. If the charger temperature goes too high then the control circuit 26, which is responsive to the temperature sensor open-circuits at least the connection between the charger and the battery so that the temperature of the charger is limited.

Figure 3:
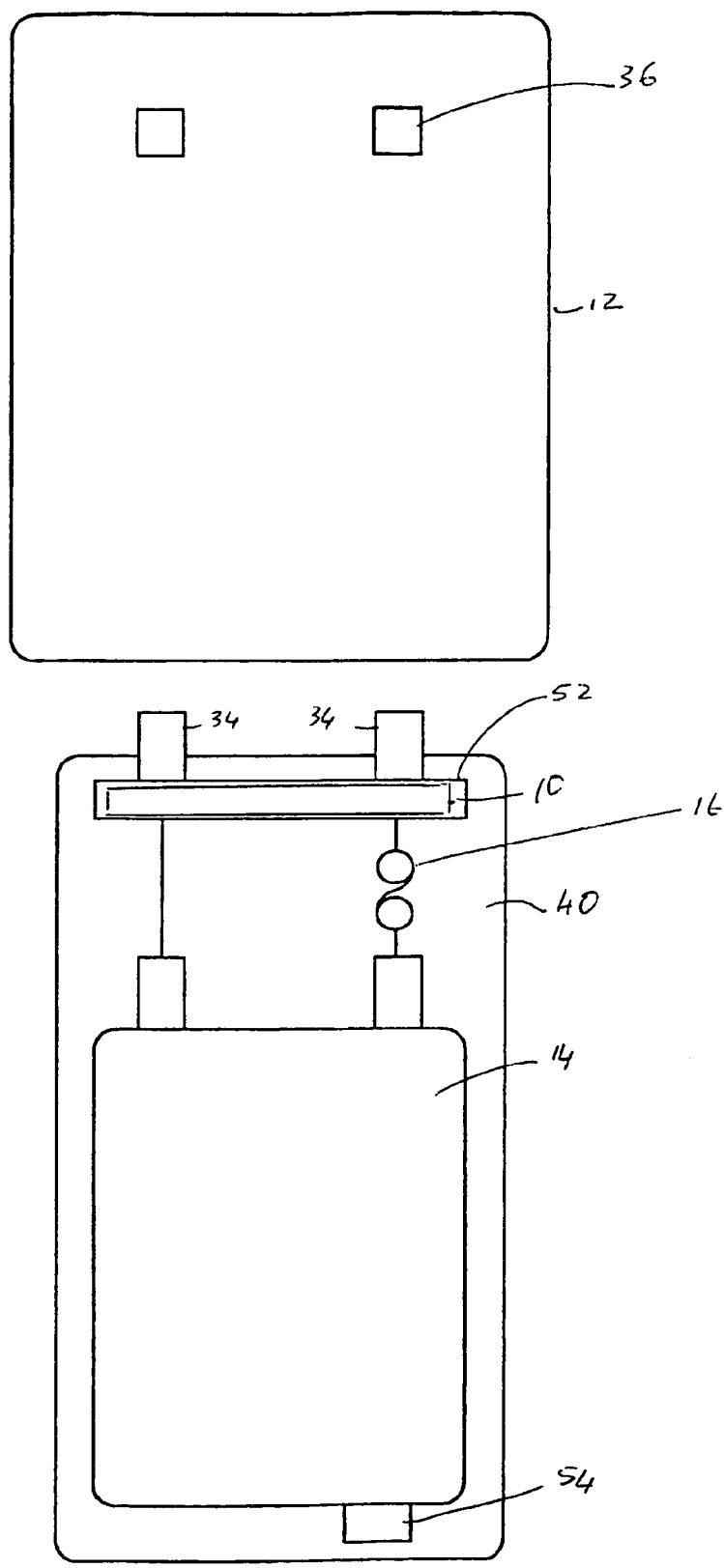
FIG. 3 is a schematic representation of a protection circuit which is provided in combination with a battery, for use with a cellular telephone, and encapsulated, as an integral unit, in an insulating material.

FIG. 3 illustrates a physical embodiment of the arrangement shown in FIG. 1. The cellular telephone 12 is shown schematically with the contacts 36 on an external surface thereof. The battery 14 and the protection circuit 10 are provided as an integral package and are encapsulated in an insulating material 40 such as a polyurethane resin. The protection circuit 10 is, prior to being embedded in the resin 40, separately embedded in an insulating material 52. In other words the circuit 10 is effectively embedded in two volumes of insulating material.

The terminals 34 are at an upper end of the assembly and are positioned so that they can be brought into electrical contact with the contacts 36 on the cellular telephone 12 when the assembly is engaged with the telephone.

The fuse 16 is physically and electrically connected between the battery and the circuit 10. It follows that when the fuse 16 is fused, due to an over-temperature or over-current condition, it is not possible thereafter to effect an electrical connection between the circuit 10 and the battery 14 for the insulating resin prevents access to electrical contact points on the battery and on the circuit.

The battery 14, as has been noted, is preferably a manganese dioxide battery of the type sold by NEC. This battery has a hydrogen gas vent point or cap 54 which is positioned at a lower region of the assembly so that hydrogen gas which is generated through use of the battery can discharge to atmosphere and does not pressurise the interior of the encapsulating resin.

The battery 14 and the circuit 10 are held in contact with the cellular telephone 12 by means of suitable clips (not shown) which act in a manner known in the art.

Figure 2:
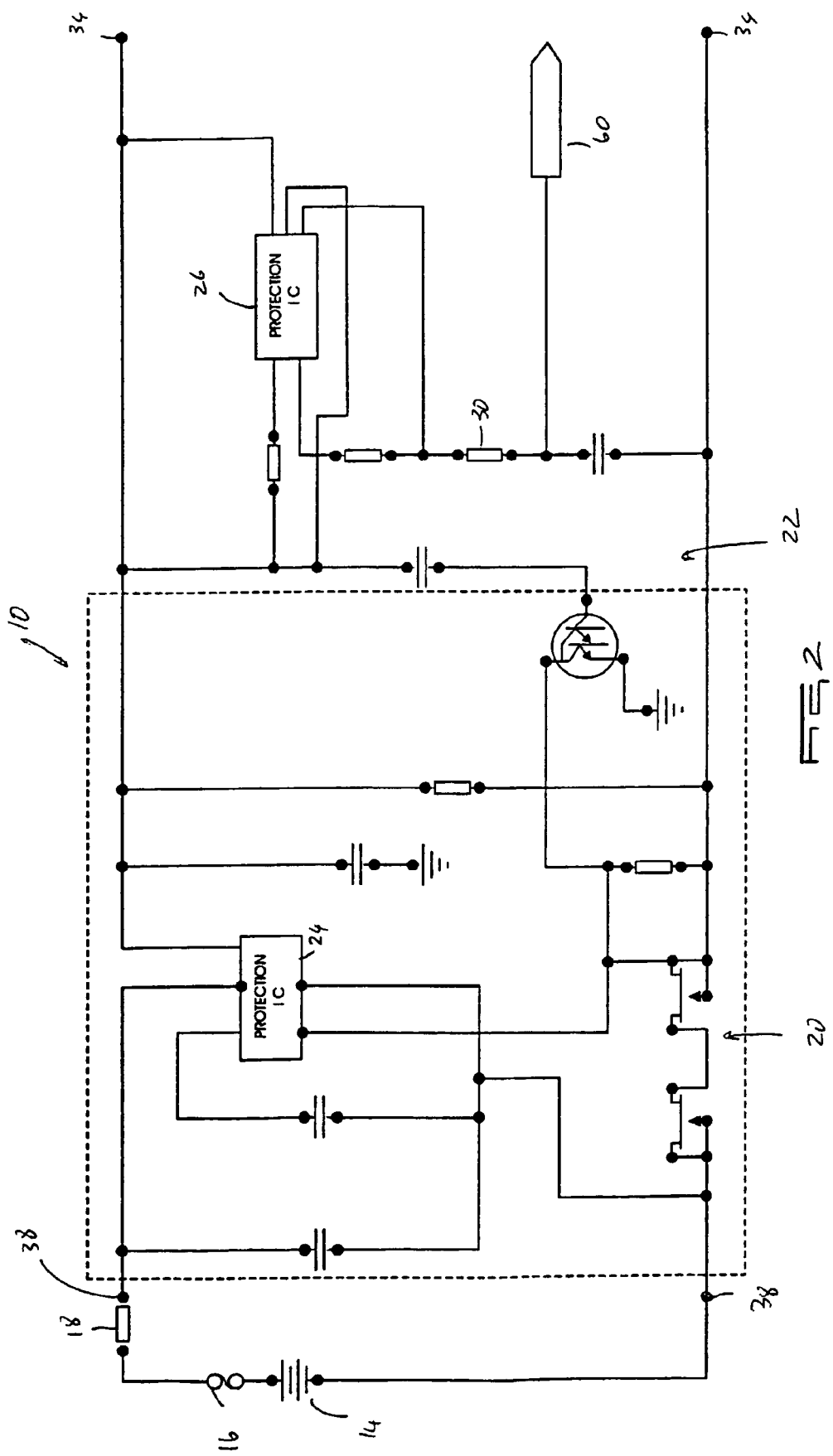
FIG. 2 is a more detailed representation of the protection circuit shown in FIG. 1.

FIG. 2 is a circuit diagram of the arrangement shown in FIG. 1. Where applicable components which are the same as shown in FIG. 1 bear like reference numbers to what has been employed in FIG. 1. The cellular telephone is not shown in FIG. 2. It is connected to the terminals marked 34. The protection integrated circuit 24 is, for example, a Mitsumi MM1491 IC. The function of this integrate circuit is to monitor the current which is delivered by the battery 14 as well as the voltage across the protection circuit 10. The voltage unit 20 includes a field effect transistor arrangement comprising, for example, a pair of Toshiba silicon N-channel Mosfets TPC 8204. The current unit 22, in this example, comprises an NPN Darlington transistor pair which acts as an high input preamplifier.

The second protection integrated circuit 26 is a micro controller and, for example, may be an ACE 0010E micro controller. This micro controller is employed for battery identification and recognition and, as stated, includes software so the cellular telephone can only be operated by the battery 14 if the identity of the battery indicates that the battery 14 is a permissible or allowed battery.

The temperature sensor 30 is conveniently a thermistor in the form of a 47K negative temperature coefficient (NTC) thermistor. The thermistor monitors the temperature of the battery 14 or of the charger 42 which is used for recharging the battery.

A contact terminal 60 is provided on the circuit 10. The arrangement is such that when the battery and protection circuit pack is connected to the cellular telephone the terminal 60 makes contact with a corresponding terminal, not shown, on the cellular telephone so that it is possible for data to be interchanged between the micro controller 26 and the flash memory in the cellular telephone, in the manner which has been described hereinbefore. This procedure permits the battery type to be identified.

On the other hand when the battery is being charged by means of the charger 42 the contact 60 permits the temperature of the charger to be sensed and relevant data is fed to the micro controller 26 which monitors the process and which is capable of open-circuiting connections if the temperature rises above a predetermined limit.

The circuit 10 is mounted on a printed circuit board, not shown. The PC board has specified track width and spacing. In general the minimum track spacing allowed, i.e. the track clearance, is 0.5 mm separation distance through solid and casting compound. On the other hand the minimum track width is 0.2 mm allowing a maximum permissible current of 1.8 Amps for temperature ranges between 100° C. to 450° C., and 1.3 Amps for 85° C.

If an over-voltage condition is detected by the voltage unit 20 then the protection integrated circuit 24 can open circuit the battery connection to the remainder of the protection circuit 10 or alternatively can act to regulate the voltage. Similarly, a high or unwanted charge or discharge current will be detected by the current unit 22 which will act to regulate the current or to open circuit the connection between the battery and the remainder of the circuit 10.

The micro controller 26 is, as has been indicated, responsive to the identification process relating to the battery type and to the temperature of the charger, when it is used. When an unwanted condition occurs, from either of these causes, the circuit 26 changes the bias on the transistor pair 22 and the protection circuit 24 open circuits.

The battery 14 is housed in a case which typically has an ingress protection of at least 20 which means that it is mechanically protected against solid objects with a size in excess of 12 mm. The insulating material in which the battery is encapsulated has a surface resistance of less than 1G Ohm which ensures that the likelihood of static electricity, would could serve as an explosive ignition source, is much reduced.

What is claimed is:

1. A protection circuit (10) for a battery (14) used with a cellular telephone, the protection circuit comprising:
    a first memory (28) storing first data which identifies the battery;
    a second memory (32) for storing second data associated with the telephone and which identifies a battery which is permitted to be used with the telephone;
    a first software driven controller (26) for comparing the first data to said second data; and
    a switch responsive to the controller (38) for connecting the battery to the telephone;
    wherein the protection circuit (110) is encapsulated in an insulating material, is provided in combination, as an integral unit with the battery (14) and is electrically connected to the battery (14) by means of a thermal fuse (16),
    wherein the first controller (26) causes the switch to connect the battery to the telephone only if the first data corresponds to the second data.

2. The protection circuit according to claim 1, further comprising: a sensor (30) for monitoring the temperature of a charger (42) which is used for recharging the battery (14), and for monitoring the temperature of the battery (14);
    wherein the first controller (26) is responsive to the sensor and is operable, when either of the monitored temperatures exceeds a predetermined temperature, to carry out at least one of disconnecting the battery from the charger, and disconnecting the battery from the telephone.

3. The protection circuit according to claim 1, further comprising a second controller (24) operable to disconnect the battery from the telephone upon the occurrence of at least one of
    the battery voltage exceeding a predetermined voltage; and
    the current drawn from the battery exceeds a predetermined current.

4. A protection circuit in combination with a cellular telephone battery comprising:
    a cellular telephone battery;
    a protection circuit having a first memory for storing first data identifying the battery and
    a first controller for comparing the first data to second data stored in a second memory,
    the second data relating to the telephone and identifying a battery type permitted to be used with the telephone, and a switch responsive to the controller for connecting the battery to the telephone, said first controller causing said switch to connect the battery to the telephone when said first data corresponds to said second data;

wherein the protection circuit (110) and the battery (14) are combined as an integral unit and encapsulated in an insulating material.

5. The combination according to claim 4, further comprising a thermal fuse electrically connecting said battery and said protection circuit.

6. The combination according to claim 4, further comprising a second controller operable to disconnect the battery from the telephone upon the occurrence of at least one of: the battery voltage exceeding a predetermined voltage, and the current drawn from the battery exceeds a predetermined current.

* * * * *